United States Patent
Ebrahimi Afrouzi

(10) Patent No.: US 11,099,562 B1
(45) Date of Patent: Aug. 24, 2021

(54) AUTONOMOUS DELIVERY DEVICE

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 355 days.

(21) Appl. No.: 16/179,855

(22) Filed: Nov. 2, 2018

Related U.S. Application Data

(60) Provisional application No. 62/580,595, filed on Nov. 2, 2017.

(51) Int. Cl.
*G05D 1/00* (2006.01)
*G05D 1/02* (2020.01)

(52) U.S. Cl.
CPC ......... *G05D 1/0088* (2013.01); *G05D 1/0225* (2013.01); *G05D 1/0276* (2013.01); *G05D 2201/0216* (2013.01)

(58) Field of Classification Search
CPC .. G05D 1/0088; G05D 1/0225; G05D 1/0276; G05D 2201/0216
See application file for complete search history.

(56) References Cited

U.S. PATENT DOCUMENTS

| 6,543,983 | B1 | 4/2003 | Felder et al. |
| 7,138,596 | B2 | 11/2006 | Pippin et al. |
| 9,741,010 | B1* | 8/2017 | Heinla ................. G06Q 10/083 |
| 10,351,399 | B2* | 7/2019 | High ................. G06Q 10/1095 |
| 2005/0131645 | A1* | 6/2005 | Panopoulos ......... G05D 1/0244 701/472 |
| 2013/0204430 | A1* | 8/2013 | Davey .................... G06F 17/00 700/216 |
| 2014/0254896 | A1* | 9/2014 | Zhou ................. G06Q 20/3829 382/124 |
| 2014/0330456 | A1* | 11/2014 | Lopez Morales .... G05D 1/0022 701/3 |
| 2016/0012465 | A1* | 1/2016 | Sharp .................. G06Q 20/386 705/14.17 |
| 2016/0068264 | A1* | 3/2016 | Ganesh ................ B64C 39/024 701/2 |
| 2016/0104099 | A1* | 4/2016 | Villamar ................ G06Q 50/28 705/26.81 |
| 2017/0300855 | A1* | 10/2017 | Lund .................. G06Q 30/0635 |
| 2017/0326598 | A1* | 11/2017 | Chelian .............. A47G 29/1214 |
| 2017/0355076 | A1* | 12/2017 | Gordon-Carroll ..... B25J 11/008 |
| 2018/0208336 | A1* | 7/2018 | Colson .................... B65B 3/022 |
| 2018/0229843 | A1* | 8/2018 | Costanzo ............... B65G 13/11 |

FOREIGN PATENT DOCUMENTS

| CN | 103736664 A | 1/2001 |
| CN | 205762372 U | 6/2016 |

* cited by examiner

*Primary Examiner* — Behrang Badii

(57) ABSTRACT

Provided is an autonomous mobile robotic device that may carry, transport, and deliver one or more items in a work environment to predetermined destinations. The robotic device may comprise a container in which the one or more items may be placed. Once tasks are complete, the robotic device may autonomously navigate to a predetermined location.

20 Claims, 5 Drawing Sheets

AUTONOMOUS DELIVERY DEVICE

CROSS-REFERENCE TO RELATED APPLICATIONS

This application claims the benefit of Provisional patent Application No. 62/580,595 which is hereby incorporated by reference. In this application, certain U.S. patents, U.S. patent applications, or other materials (e.g., articles) have been incorporated by reference. Specifically, in addition to the preceding, U.S. patent application Ser. Nos. 15/272,752, 62/631,050, 62/661,802, 16/051,328, and 15/951,096 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF INVENTION

The present disclosure relates to robotic devices, and more specifically to robotic devices that assist with delivering items.

BACKGROUND OF INVENTION

Autonomous or semi-autonomous robotic devices provide assistance to individuals by eliminating various tasks from an individual's workload. For example, robotic devices have been introduced that provide cleaning tasks so that an individual does not have to do so. Currently, when delivering items such as mail items, packages or the like, such items must be hand delivered to each location requiring physical exertion on the part of an individual. This can be strenuous on the part of the individual picking up or delivering items. For example, mail delivery services or package services such as UPS, FEDEX, USPS etc., require large amounts of physical exertion on the part of the individual delivering such parcels and packages to locations such multi-unit buildings, condominiums, apartments, homes, offices and the like. This is undesirable as the large amounts of walking, carrying, bending may lead to injury or other consequences and is also very time consuming on the part of the individual. Robotic devices offer a useful solution for eliminating these tasks from an individual's physical demands.

None of the preceding discussion should be taken as a disclaimer of any of the described techniques, as the present approach may be used in combination with these other techniques in some embodiments.

SUMMARY

The following presents a simplified summary of some embodiments of the present techniques. This summary is not an extensive overview of the invention. It is not intended to limit the invention to embodiments having any described elements or to delineate the scope of the invention. Its sole purpose is to present some embodiments of the invention in a simplified form as a prelude to the more detailed description that is presented below.

Some aspects include a robotic device utilized for carrying, transporting, and delivering packages, parcels, and mail items, the robotic device comprising: one or more processors, a chassis including a set of wheels, a motor for driving the set of wheels, a suspension system, a rechargeable battery for providing power to the robotic device, a control system module for controlling the movement of the robotic device, a set of sensors, a screen with graphical user interface, a module for receiving packages, parcels, and mail items, and a module for delivering packages, parcels, and mail items.

Some aspects include a method for carrying, transporting, and delivering packages, the method comprising: providing a robotic device, the robotic device comprising: one or more processors, a chassis including a set of wheels, a motor for driving the set of wheels, a suspension system, a rechargeable battery for providing power to the robotic device, a control system module for controlling the movement of the robotic device, a set of sensors, a screen with graphical user interface, a module for receiving packages, parcels, and mail items, a module for delivering packages, parcels, and mail items, a module for providing packaging materials, a module for printing labels, and a module for processing payment transactions; the robotic device receiving a command for a work order from an individual or delivery and collection vehicle; the robotic device receiving packages, parcels, and mail items from an individual or delivery and collection vehicle; and the robotic device delivering packages, parcels, and mail items to a predetermined location.

BRIEF DESCRIPTION OF DRAWINGS

The present techniques are described with reference to the following figures.

DETAILED DESCRIPTION OF THE INVENTIONS

Figure 1:
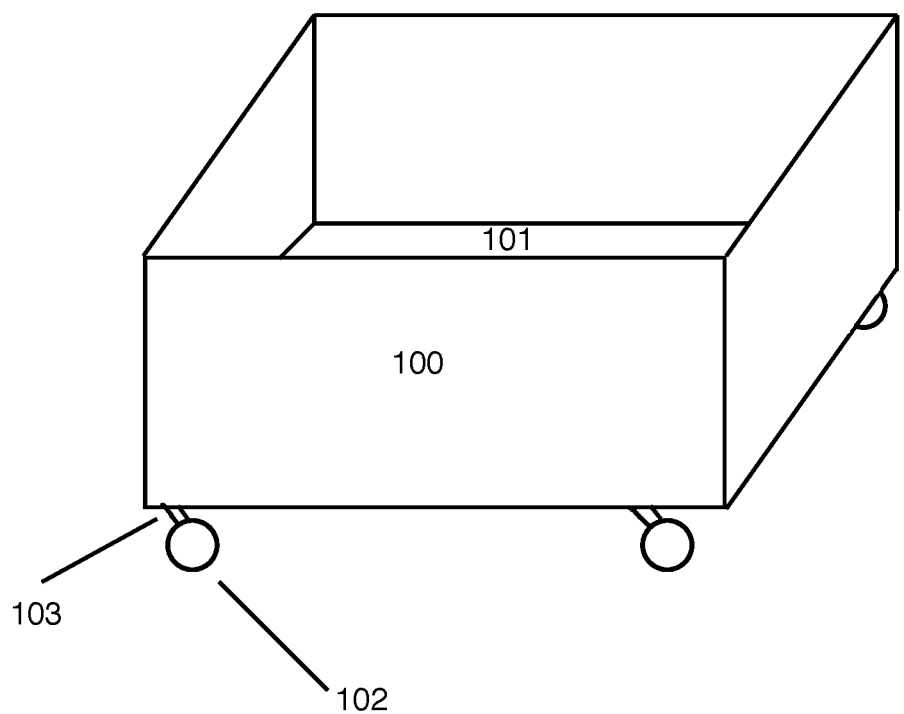
FIG. 1 is a schematic diagram of an example of a robotic device with which the present techniques may be implemented in some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering trade-offs may warrant systems that only afford a subset of the benefits described herein or that will be apparent to one of ordinary skill in the art.

Various embodiments are described herein below, including methods and systems. It should be kept in mind that the invention might also cover articles of manufacture that include a computer-readable medium on which computer-readable instructions for carrying out various embodiments of the inventive techniques are stored. The computer-readable medium may include semi-conductor, magnetic, opto-magnetic, optical, or other forms of computer-readable medium for storing computer-readable code. Further, embodiments may also include apparatuses for practicing embodiments of the invention. Such apparatus may include circuits, dedicated and/or programmable, to carry out tasks pertaining to embodiments described herein.

In some embodiments, "robot" or "robotic device" may include one or more autonomous or semi-autonomous devices having communication, an actuator, mobility, and/or processing elements. Such robots or robotic devices may, but are not required to (which is not to suggest that any other described feature is required in all embodiments), include a casing or shell, a chassis, a transport drive system such as wheels or other mobility device, a motor to drive the wheels or other mobility device, a receiver that acquires signals transmitted from, for example, a transmitting beacon, a processor and/or controller that processes and/or controls motors, methods, and operations, network or wireless communications, power management, etc., and one or more clock or synchronizing devices. Robots or robotic devices may also include a power module for delivering (and in some cases storing) electrical power, a sensor module for observing the environment and for sending commands based on the observed environment, and a control module for storage of operation modes, command responses to the observed environment or user input, and the like. The sensor module may include sensors for detecting obstacles, types of flooring, cliffs, system status, temperature, and the like or sensors for measuring movement. An interface module may also be included to provide an interface between the robot and the user. The robot or robotic device may further include IR sensors, tactile sensors, sonar sensors, gyroscopes, ultrasonic range finder sensors, depth sensing cameras, odometer sensors, optical flow sensors, LIDAR, cameras, IR illuminator, remote controls, Wi-Fi capability, network card, Bluetooth capability, cellular functionality, USB ports and RF transmitter/receiver. Other types of robots or robotic devices with other configurations may also be used.

As understood herein, the term "user", "users", "individual" or "individuals" may be defined generally to include any entity that utilizes the mobile robotic device including humans, other robotic devices, control systems, other devices, and the like.

As understood herein, the term "work cycle", "work session", "operational session" or "operational cycle" may be defined generally as a work time of a robotic device from start to finish, whether ended by completion of work of an area, by instruction or programmed setting, or by the depletion of a battery powering the robotic device.

In embodiments, a control system of the robotic device may be utilized. The control system may include, but is not limited to, a system or device(s) that perform, for example, methods for receiving and storing data; methods for processing data; methods for processing command responses to stored or processed data, to the observed environment, to internal observation, or to user input; methods for detecting operational hazards in the work environment; and methods for navigation and other operation modes. For example, the control system may receive data from an obstacle sensor, and based on the data received, the control system may respond by commanding the robotic device to move in a specific direction. As a further example, the control system may receive image data of the observed environment, process the data, and use it to create a map of the environment. The control system may be a part of the robotic device, the camera, a navigation system, a mapping module or any other device or module. The control system may also comprise a separate component coupled to the robotic device, the navigation system, the mapping module, the camera, or other devices working in conjunction with the robotic device. More than one control system may be used.

As understood herein, the terms "work environment" or "location" may be defined generally to include a work location in which a robotic device is operating including but not limited to, buildings, multi-unit buildings, apartment complexes, apartment buildings, condominium buildings, neighborhoods, homes, office buildings, offices, retail establishments, malls, convenience stores, parking lots, and the like.

As understood herein, the term "item" or "items" may be defined generally to mean parcels, packages, mail, or any payload being delivered by the robotic device.

As understood herein, the term "work area" may be defined generally to mean the general area in which a robotic device is operating in.

Embodiments of the invention propose an autonomous mobile robotic device that may carry and transport items within an environment. The robotic device may comprise but is not limited to, a set of wheels, a power source, a chassis, a suspension system, a rechargeable battery, a communications module, one or more control modules and a processor. In embodiments, the robotic device may further comprise a basket or container in which items may be placed and carried. In some embodiments, the robotic device may further comprise a screen with graphical user interface for, for example, adjusting settings, choosing functions, scheduling tasks, etc., a mapping module for mapping the environment using mapping techniques such as SLAM, and mapping tools such as imaging devices, sonar devices, LIDAR and LADAR devices, structured light devices, stereo vision and the like. In some embodiments, the robotic device may further comprise a localization module. Cameras, LIDAR, LADAR, stereo imaging, signal detectors and receivers, gyroscope, optical encoder, optical flow sensor, TOF sensors, depth sensors and other devices may be used to capture information that the processor of the robotic device may use to localize itself within an internal map of the working environment. In some embodiments, the processor of the robotic device may use machine learning techniques to learn the most optimal route for transporting an item from a first location to a second location and so forth. Various observations may be collected during operation in order to determine the most optimal path for the robotic device when transporting the item(s). For example, observations such as number of collisions, travel time, number of stalls, and travel distance may be used in determining the most optimal path. In some embodiments, the robotic device may have a wireless module to wirelessly send and receive information, such as a Wi-Fi module, a Bluetooth module, a RF module and the like. In some embodiments, the robotic device may comprise a scheduling module for, for example, setting a schedule for transportation of items. This may include the day, time, frequency, transportation time to a specific location, and the like. In embodiments, the robotic device may have voice-activated capabilities. In some embodiments, the robotic device may comprise a payment module, in which the robotic device is capable of carrying out payment transactions. In embodiments, the suspension system of the robotic device may comprise a dual suspension system. An example of a suspension system may be found in U.S. patent application Ser. No. 15/951,096, hereby incorporated by reference in its entirety. In some embodiments, a robotic device may comprise a module for capturing images in a work environment in order to identify locations in the work environment. For example, utilizing an image capturing module, a robotic device may capture an image of an address on the side of a home, or a unit number of an apartment, and one or more processors of a robotic device may extract and identify features in the captured image such as numbers or letters in order to identify locations in the work environment. In turn the one or more processors of a robotic device may identify the features captured in the image and pair that with an address of an item carried by the robotic device matching that in the image in order to identify a delivery destination. In some embodiments, a robotic device may come with a prerendered map of the work environment, with data pertaining to each location of the map such as address information and the like.

In embodiments, the robotic device may carry and transport items at locations with the purpose of a carrying, transporting, and delivering items. For example, in an apartment building, the robotic device may carry items such as packages, parcels, mail or the like from a mail delivery vehicle to a front door of an apartment. In some embodiments, the robotic device may be able to carry and transport a variety of different types of items. For example, a robotic device may have the ability to carry and transport items such as, for example, large packages such as boxes while also transporting mail such as smaller envelopes. In embodiments the robotic device may be able to deliver items to multiple different locations in a single work session. For example, a robotic device may obtain items from a package delivery and collection vehicle, and drop off packages at their respective delivery locations in one navigational session. In some embodiments, a robotic device may be able to obtain outgoing items for delivery to a delivery and collection vehicle. For example, a robotic device may be able to obtain outgoing items from, for example, a front door, a centralized outgoing location where all outgoing items are placed, or the like, and deliver these items to an delivery and collection vehicle. For example, a robotic device may deliver outgoing mail to a delivery and collection vehicle, at the same time that the delivery and collection vehicle arrives to deliver inbound mail to the robotic device. In some embodiments, a robotic device and delivery and collection vehicle may exchange inbound and outbound packages, parcels, and the like simultaneously. In some embodiments, a robotic device and delivery and collection vehicle may exchange inbound and outbound packages, parcels, and the like consecutively. In some embodiments, a robotic device may be utilized for the sole purpose of transporting and delivering inbound packages, parcels or the like. In some embodiments, a robotic device may be utilized for the sole purpose of transporting and delivering outbound packages, parcels, or the like. In some embodiments, a robotic device may deliver an item at, for example, a front door, and obtain an outgoing item from the same location simultaneously. In some embodiments, a robotic device may deliver an item at, for example, a front door, and obtain an outgoing item from the same location consecutively. In some embodiments, a robotic device may deliver all inbound items in an area, before returning to pickup all outbound items. In some embodiments, a robotic device may obtain all outbound items in an area first, before returning to deliver all inbound items. In some embodiments, the robotic device may be stored in at least one specific location until the robotic device is provided with instructions for a work session. For example, the robotic device may be stored at a docking station until instructions are received to perform work functions. In embodiments, a robotic device may comprise solar panels for recharging a battery of the robotic device. In embodiments, a battery of a robotic device may be charged at a docking station. In embodiments, the robotic device may be stored in at least one specific location until the robotic device is provided with instructions to perform work functions, transporting items to one or more particular locations and/or executing a scheduled command. For example, the robotic device may be stored in a specific location, until commands are received to retrieve packages from a specific location and to transport the packages to a second location at a specific time. In another example, a robotic device may be stored at a specific location after which it is requested by an individual and will navigate to that individual for obtaining or delivering an item. In some embodiments, the robotic device may comprise a basket or container in which items are placed therein. In some embodiments, the robotic device may comprise a platform, in which items are placed thereon. In some embodiments, the item(s) placed on or within the robotic device may be placed as such by, for example, a mechanism of the robotic device, an individual, another robotic device, another machine, another device, or the like. In some embodiments, the item(s) placed on or within the robotic device may be collected from at least one predetermined location. In some embodiments, the item(s) placed on or within the robotic device may be collected at at least one predetermined date and time. In some embodiments, the item(s) placed on or within the robotic device may be collected on a recurring basis such as, for example, a weekly or bi-weekly basis. In some embodiments, items may be transported at specific times to one or more locations. For example, packages may be picked up from a delivery and collection vehicle and delivered to more than one home in a neighborhood. In some embodiments, after distributing or delivering an item or completing a work task, the robotic device may autonomously navigate back to a designated storage location. In some embodiments, a robotic device may comprise a module for the packaging of items. For example, a robotic device may utilize a module that packages items of which an individual is mailing such as a box, envelope, bag, or the like. In embodiments, for example, a robotic device may provide a packaging material such as a box, bag, or envelope, an individual may place the outbound item into the packaging material, after which the robotic device may seal the package. In some embodiments, a robotic device may provide a postage module, the robotic device printing postage for an outbound item.

In some embodiments, if delivery of an item fails, a robotic device may return the item to the location it was initially obtained from. For example, in embodiments, if a robotic device attempts to deliver an item such as a package to a front door of an apartment within a multi-unit apartment complex, and the tenant is not available for receiving the package, the robotic device may return the package to a delivery and collection vehicle, or may deliver the package to a centralized location such as at an apartment manager's office of which the tenant may thereafter retrieve the package, or of which the robotic device may attempt to deliver the package at a later date. In embodiments, if a robotic device fails to deliver an item, due to, for example, a tenant being unavailable, the robotic device may leave a note for the tenant alerting the tenant that delivery was attempted, or that an item awaits them at a specific location.

In some embodiments, a robotic device may be included with a package, postal, parcel, or the like delivery and collection vehicle. For example, a delivery and collection vehicle may arrive in a neighborhood, at a building, or the like, and a robotic device may be offloaded from the delivery and collection vehicle, loaded with packages, parcels, or the like, and the robotic device may deliver all items throughout the neighborhood, the robotic device thereafter returning to be loaded back onto the delivery and collection vehicle. In some embodiments, a robotic device may remain within a physical area such as a location in a neighborhood, in a building, or the like, and the robotic device may be loaded with inbound and outbound packages, parcels, and the like, and the robotic device will deliver inbound items to their respective destination locations within the neighborhood, building or the like, and also deliver outbound packages to an outbound mail location such as a mailbox, delivery and collection vehicle, or the like. For example, in a neighborhood, a robotic device may be housed at a storage or docking station, and a delivery and collection vehicle may arrive after which the robotic device may approach the delivery and collection vehicle, the robotic device thereafter being loaded with packages, parcels and the like, the robotic device thereafter delivering such items to their respective delivery locations. As a further example, when outbound mail is given to the robotic device, the robotic device may deliver such outbound mail to a delivery and collection vehicle when it arrives. As a further example, a robotic device may be housed in a central location of a building, such a lobby or mailroom of a building or the like, and the robotic device may receive all inbound mail and outbound mail at this location the robotic device thereafter navigating to specific locations to deliver items. In embodiments, after a robotic device has completed delivering items, the robotic device may navigate to a docking station, storage location, or the like. In embodiments, after a robotic device has completed delivering items, the robotic device may navigate back to a delivery and collection vehicle. In some embodiments, multiple robotic devices may be utilized for an area such as a neighborhood or building. In some embodiments, when multiple robotic devices are utilized for an area such as a neighborhood or building, each robotic device may be dedicated to particular sections of the work area, such as a first robotic device being dedicated to servicing homes with even addresses while a second robotic device services homes with odd addresses on a street. In some embodiments, when a robotic device contains outbound mail, the robotic device may communicate with a central server of a mail delivery service utilizing a communications module that the robotic device contains outbound mail. In some embodiments, a first robotic device may handle storing transporting and delivering outbound items, while a second robotic device handles the storing, transport, and delivering of inbound items. In some embodiments, when a delivery and collection vehicle has arrived within a predetermined distance of a robotic device, a robotic device may be summoned for receiving of packages, parcels, and the like from the delivery and collection vehicle. In some embodiments, a robotic device may service an entire, portions of, blocks of, or a block of, a neighborhood. In some embodiments, a robotic device may provide services for multiple units in a building. In some embodiments, a robotic device may navigate in a building, autonomously navigating into elevators and the like. In embodiments, the robotic device may have a communication ability for communicating with an elevator in order to order the elevator to navigate to a particular floor. In embodiments, the robotic device may have a module for interacting with the buttons of the elevator such that the robotic device selects which floor the elevator is to navigate to.

In some embodiments, scheduling information for the pickup, transportation, and delivery of items may be provided to one or more processors of the robotic device. In some embodiments, scheduling information may be sent to a robotic device using a mobile communication device with a graphical user interface, remote control, a screen with graphical user interface on the robotic device, or another type of device that may communicate with the one or more processors of the robotic device. For example, a graphical user interface such as that described in U.S. patent application Ser. Nos. 15/272,752, 62/631,050, and 62/661,802, hereby incorporated by reference in their entirety, may be used for entering scheduling information. In some embodiments, a method for providing scheduling information to a robotic device such as that described in U.S. patent application Ser. No. 16/051,328, hereby incorporated by reference in its entirety, may be used. In some embodiments a web application, mobile application or software may be used for scheduling and sending scheduling information to the one or more processors of the robotic device. In some embodiments, scheduling information may be sent to the one or more processors of the robotic device using Wi-Fi, Bluetooth, RF, or other types of wireless connections. In some embodiments, auditory instructions may be provided to the robotic device by, for example, an individual, specialized computer, robotic device, or control system. For example, an individual may audibly command the robotic device to package and transport an item such as a package, to be delivered to a delivery and collection vehicle for mailing. In some embodiments, the robotic device may comprise a microphone module to receive voice commands. In embodiments, an individual may command the robotic device to pick up an item, setting a schedule for the time and location of pickup of an item. For example, utilizing an application of a communications device, an individual may select that a package be picked up at a particular time, and delivered at a particular time to an outgoing package location such as a neighborhood outgoing mailbox. In some embodiments, a graphical user interface of a communications device, or a screen with graphical user interface of a robotic device may display information regarding pricing for packaging an item, weight of an item, scheduling information such as pickup and delivery times, and the like. In some embodiments, an individual may be able to interact with a graphical user interface of a communications device or a screen with graphical user interface of a robotic device for viewing pricing information and paying for postage for an item. In some embodiments, a robotic device may comprise a scale for the weighing of packages. In embodiments, a weight scale of a robotic device may be utilized for the purpose of displaying pricing data for the mailing of an item. In embodiments a robotic device may comprise a module for payment, such as a module for paying for postage for an item. In some embodiments, a robotic device may comprise a printing module, for printing a postage label. In some embodiments, an individual may interact with a robotic device, by obtaining packaging materials from the robotic device, packaging an item to be mailed or shipped, weighing the package, and paying for postage for the item. In some embodiments, a robotic device may provide pre-paid packaging options, flat-rate packaging options, or other packaging options.

In some embodiments, a robotic device may comprise a code scanning module for scanning barcode or QR code data for an item. For example, in embodiments, an individual may utilize an application of a mobile communications device such as a smartphone, tablet, laptop or the like, in which a barcode, QR code, or the like may be generated, and the code generated is scanned by a code scanner of a robotic device. In embodiments, the code generated may represent a profile specific to the individual, and the code scanning module of the robotic device may scan the code to retrieve data specific to the individual. In embodiments, when a code scanner of a robotic device obtains data specific to the individual, the data may be representative of prior shipping history such as pickup and delivery history, individual's address, delivery location, individual's payment methods including payment data, demographic data, contact information, and the like. In some embodiments, data may reflect shipping information including shipping trends such as weight of prior packages, frequency of packages, type of address such as if shipping from or to a business address or the like. In embodiments, data pertaining to prior shipping trends may influence the behavior of a robotic device such as a robotic device predicting that the robotic device's services are required prior to being summoned as such. In embodiments, a code scanner of a robotic device may be utilized for scanning a code located on a package, in order to identify that the package in question has been obtained. In some embodiments, a code scanner of a robotic device may be utilized for scanning a code of a package to display or update tracking information of a package, the data displayed on, for example, a screen with graphical user interface of a robotic device, a graphical user interface of an application of a communications device, via an audible message made by the robotic device or application of a mobile communications device, or the like. In some embodiments, a robotic device may provide tracking data and an individual may interact with the robotic device to obtain tracking information for an item that has shipped.

In some embodiments, delivery of the items such as packages may be set to a specific location. For example, an individual may specify that they wish for packages to be delivered to a back porch rather than front door, or that a package should be delivered to a front desk of an apartment complex, or the like. In some embodiments, an individual may specify that they wish to drop off an item to a robotic device at a specific location and the robotic device will navigate to this location to retrieve the item. In embodiments, a robotic device may identify the location of an individual, or a location identified by an individual, using for example, coordinates in a GPS coordinate system, which may be communicated to one or more processors of the robotic device via an application of a communications device such as, for example, a smartphone, tablet, laptop, computer, or the like, and the robotic device will navigate to this location for delivery or pickup of packages. In some embodiments, a robotic device may contain a prerendered map of the work environment and the location of the individual may be marked in the map, such as, by a communication from an application of a communications device of the individual. In some embodiments, delivery of items may be for a specific location of all items to be delivered or picked up, with all individuals traveling to this location for retrieval or drop off of the items. For example, delivery of items may be at a pre-designated location such as a front desk of an apartment building, or a multi-home mailbox for a neighborhood and all individuals must obtain and drop off their items from this location, where the robotic device will deliver and obtain the items. In embodiments, a robotic device may navigate to the location of the individual, and the robotic device may generate a map of the work environment as the robotic device traverses through the work environment. In embodiments, the time at which the robotic device navigates to a location for delivery of an item may vary. In embodiments, for example, a robotic device may navigate to and deliver an item as soon as an individual arrives at a location. As an example, an application of a communications device may communicate with one or more processors of a robotic device in order to alert in real time that any of: an individual has arrived within a predetermined vicinity of a robotic device, an individual has arrived at a predetermined location, or the like, and the robotic device may thereafter navigate to deliver the purchased items to the purchaser. For example, if an individual arrives home, an application of a communications device may communicate with one or more processors of a robotic device to relay this information and if an item is waiting for the individual, the robotic device may thereafter deliver the said item. In some embodiments, a robotic device may arrive at a predetermined location at the same time that the individual arrives for delivery or pick up of items, the robotic device navigating to the location ahead of time or arriving at the location simultaneously with the individual. In some embodiments, a robotic device may navigate to a location after an individual arrives at the location for pickup or delivery of items, the robotic device navigating to the location of the individual. In some embodiments a robotic device may monitor in real time the location of an individual via an application of a communications device in the possession of the individual. In some embodiments, an individual may summon a robotic device utilizing an application of a communications device, remote control, voice command, via a screen with graphical user interface of the robotic device, and the like. In embodiments if an unexpected delay occurs on the part of the individual, one or more processors of the robotic device may elect to choose a behavioral response on the part of the robotic device. As an example, if an individual encounters heavy traffic thereby delaying the individual for a lengthy period of time, one or more processors of a robotic device may determine that the individual is delayed, and thereby alter a delivery time for an item until the time when the individual arrives at a predetermined location.

In embodiments, the one or more processors of a robotic device may learn a path, such as a path between a first location and a second location, in a variety of ways. In some embodiments, the robotic device may be taught a path by directing the robotic device along the desired path by physically moving the robotic device or by using a remote control or an application of a communication device paired with the robotic device. Other methods of moving the robotic device along the desired path may also be used. For example, the robotic device may be taught a path between a first location by physically wheeling the robotic device from the first location, through the environment, to a second location. In some embodiments path learning may be initiated by, for example, a user pressing a start button on the robotic device or on any other device capable of communicating with the robotic device, voice activation or autonomously upon startup. In some embodiments, path learning may be completed by, for example, pressing an end button on the robotic device or on any other device capable of communicating with the robotic device, voice activation, or autonomously upon detecting no movement of the robotic device. Path learning may be initiated when the robotic device is positioned at a first location of the robotic device and completed after the robotic device has navigated along the desired path to a second location. In embodiments, there may be multiple locations along the path between the first and second location in which the robotic device may stop. In some embodiments, wherein the path of the robotic device comprises driving one way along a path and returning back in the same way along the same path, path learning may be initiated when the robotic device is positioned at the first location and completed after the robotic device has navigated to the location in which the robotic device is to turn around and return back along the same path to the first location. Alternatively, in some embodiments, path learning may be initiated and completed using an application of a communication device, such as a mobile device, laptop or smart phone, capable of communicating with the robotic device. In some embodiments, an application of a communication device may be used to mark a path of the robotic device within a map of the environment that may be shared with the robotic device. During path learning, the processor of the robotic device may determine its location within an internal map of the environment while simultaneously mapping the environment. In some instances, the processor of the robotic device may mark observed obstacles or features in the working environment within an internal map of the environment. In some embodiments, a robotic device may attempt to navigate along a most efficient path possible. For example, if a robotic device is delivering items to multiple locations, a robotic device may navigate along the path and stop at each location in a manner in which the most optimal time efficiency is achieved. For example, in a neighborhood, a robotic device may deliver items to multiple locations, the robotic device stopping at each subsequent location which is closest to the last delivery location in order to navigate efficiently. For example, a robotic device may navigate to each subsequent home on a street in order to navigate in a most efficient manner possible. In some embodiments, a robotic device may navigate back to a location due to input from an individual. For example, a robotic device may navigate efficiently, delivering items to locations, and then navigate in a less efficient manner to a location based on user input, such as a request from an individual to drop off an outgoing package to the robotic device.

In some embodiments, a memory of the robotic device may contain an internal database of obstacles likely to be encountered within the working environment. In embodiments, an obstacle encountered in the work environment may be identified using various sensors to capture features of the obstacle and the processor to determine the type of obstacle based on the internal database. The processor of the robotic device may note the increased likelihood of that type of obstacle being located in the region of the environment in which it was encountered. For example, if a robotic device encounters a hose on the ground, image sensors of the robotic device may capture features of the hose and the processor may determine it is a hose based on an internal database of obstacles and their features. The processor of the robotic device may mark the region in which the obstacle was encountered within an internal map as a region with increased likelihood of containing such an obstacle. In some embodiments, the processor may further determine if an obstacle may be overcome by the robotic device such as by, for example, providing for the robotic device to attempt to overcome the obstacle by driving over it. If, however, the robotic device encounters a large obstacle of which the robotic device may not overcome, such as a for example, a planter, the processor may determine that it cannot overcome the obstacle and may attempt to maneuver around the obstacle. In embodiments, if a robotic device is unable to overcome an obstacle of which it has attempted to overcome, one or more processors of the robotic device may catalogue the encounter for future use. In some embodiments, regions wherein obstacles are consistently encountered may be classified by the processor of the robotic device as an area with a high likelihood of containing obstacles and may be marked in an internal map of the robotic device with regards to the work environment as such. In some embodiments, one or more processors of the robotic device may attempt to alter the robotic device's path in order to avoid high obstacle areas.

In embodiments, one or more processors of the robotic device may generate multiple maps of the working environment over multiple working sessions. The maps may be stored in a memory of the robotic device and may be combined with previously generated maps using the one or more processors of the robotic device to keep the map of the working environment up to date. In some embodiments, a prerendered map of the working environment may be generated and stored in an internal memory of the robotic device. In some embodiments, the robotic device may generate a map of the environment during operation in the environment. In embodiments, the one or more processors of the robotic device may update the internal map of the environment with the observations collected during each successive work session. Continuous updates to the map of the environment may help establish the most efficient path of the robotic device.

In some embodiments, the robotic device may alert the user when an unanticipated obstacle blocking the path of the robotic device is encountered, particularly when the robotic device may not overcome the obstacle by maneuvering around or driving over the obstacle. The robotic device may alert the user by generating a noise, sending a message to an application of a communication device paired with the robotic device or any other device paired with the robotic device, displaying a message on a screen with graphical user interface of the robotic device, illuminating lights, and the like.

In some embodiments, the robotic device may comprise a module for regulating the temperature within a container of the robotic device. In some embodiments, the robotic device may comprise a module for regulating the temperature of items carried by the robotic device. In some embodiments, the robotic device may comprise a cooling module such as for example a refrigeration module in which items are kept at a particular temperature. In some embodiments, the robotic device may comprise a cooling module such as for example a freezing module at which items are kept at a particular temperature. In some embodiments, a robotic device may comprise a warming or heating module for warming or heating items carried and transported by the robotic device. In some embodiments, the robotic device may comprise a cooking module such as a microwave or oven in which an item may be cooked.

In some embodiments, advertising may be displayed on a screen with graphical user interface of a robotic device or an application of a communications device paired with the robotic device. In some embodiments, a screen of a robotic device may be a touchscreen.

In some embodiments, one or more commands may be provided to one or more processors of the robotic device by, for example, a user, another robotic device, a control system, a specialized computer, etc. In embodiments, the command may be provided to the processor using verbal commands, a mobile application and/or web application and/or software, a communication device with a graphical user interface paired with the robotic device, and/or a screen with graphical user interface on the robotic device. For example, an individual may verbally command the robotic device to package, carry and transport items such that the individual does not need to physically package, carry, or transport the items. In some embodiments, an application of a mobile communications device may be utilized in which a purchaser gives commands to a robotic device. In some embodiments, a communication device or an application of a communication device may be used to command the robotic device to remain within a predetermined range of the communications device. In embodiments, commands may be given through an application of a mobile communications device to a robotic device such that the individual does not need to physically package, carry, or transport the items. In embodiments, for example, an individual, using an application of a communications device, may make a purchase for an item to be packaged and mailed ahead of time, prior to handing the item in question to be packaged over to the robotic device, the robotic device thereafter arriving to package, carry and ship the outgoing item. In some embodiments, an individual may be able to remotely control the movements and actions of a robotic device utilizing, for example, an application of a communications device, a remote control, or the like. For example, a robotic device may contain a camera providing a live camera feed to an individual such as a package delivery individual such as for example, a mailman, delivery and collection vehicle driver, or the like, and the package delivery individual may access the live feed and remotely control the actions of the robotic device utilizing, for example, an application of a communications device, navigating the robotic device through the work environment and giving commands to the robotic device to take work actions, such as to deliver an item to a location remotely. For example, a driver of a delivery and collection vehicle may offload a robotic device from the vehicle, load the robotic device with packages for delivery, remotely control the robotic device to deliver the items, and remotely control the robotic device to navigate back to the delivery and collection vehicle. In some embodiments, an individual may place items into or on the robotic device themselves. In other embodiments, the robotic device may contain a module for obtaining the items without requiring an individual's physical intervention. In some embodiments, a robotic device may comprise a module for the handling of items, such as, for example, a mechanism for delivering and obtaining a box, a sliding mechanism, a pushing mechanism, an armature, an angling mechanism, a tilting mechanism, or the like. In some embodiments, a robotic device may comprise a module for tilting or angling itself such that items slide off of the robotic device for delivery. For example, a robotic device may comprise a platform, and the robotic device may angle the platform when it has arrived at a delivery location such that the items slide off of the platform. In another embodiment, a robotic device may comprise a basket or container with a door, such that when the robotic device has arrived for delivery, the robotic device angles the basket or container such that the items slide off of the robotic device through the basket or container door for delivery. In some embodiments, a voice command may be given such that the robotic device remains within a predetermined range of an individual. In other embodiments, a mobile application of a communication device, such as a smartphone, paired with the robotic device may autonomously initiate the robotic device to execute a command when the communication device is within a predetermined range of the robotic device. In other embodiments, information gathered by the robotic device may be used to initiate a particular action of the robotic device. For example, upon sensing that an individual who has an item which is pending delivery has arrived at a location such as for example a home, the robotic device may transport the items to the location of the individual. As a further example, upon detecting that an individual has entered a building such as an office building, a robotic device may approach and follow that individual as the individual navigates to a specific location such as an office. In some embodiments, the robotic device may autonomously follow an individual around a work environment navigating through the work environment autonomously without physical intervention on the part of the individual.

In some embodiments, commands and/or instructions for one or more robotic devices may be set within a control system of the one or more robotic devices. In some embodiments, preferences or instructions corresponding to a particular individual may be set within the control system. In embodiments, the control system may instruct a robotic device to execute a particular task when a particular individual becomes present within an environment. For example, upon a particular individual entering a work environment, the control system may instruct a robotic device to the location and proximity of the individual such that the robotic device remains within a predetermined distance from the individual even as the individual traverses the work environment. For example, a robotic device may follow an individual around an office environment, obtain items from the individual, deliver them to specific locations, and navigate back to the individual, repeating such a cycle throughout a day. In some embodiments, the control system may detect an individual using sensors, cameras, or the like, or may be made aware that an individual has entered an area of the environment by a signal sent from a communication device paired with the control system, the robotic device, or other control system. A communication device may comprise a mobile device, tablet, laptop, remote control, etc.

In embodiments, preferences may be set for operations or navigation of a robotic device. For example, utilizing a user interface of a communication device paired with the robotic device, such as a mobile device, laptop, tablet, smartphone, or the like, preferences may be set for the robotic device. In embodiments, for example, utilizing an application of a communication device path learning may be initiated and completed, path planning may be set, operational functions may be selected, scheduling information may be selected, and the like. In embodiments, for example, preferences may be selected for a robotic device with regards to for example, when or where an individual ships or receives items, what rate of navigational speed a robotic device is to navigate at, where a robotic device is to deliver items to, what type of items an individual tends to send in outgoing packages, the date and time items are shipped or obtained by a robotic device, how an individual prefers items to be packaged such as for example whether the individual prefers items to be very secure, packaged in a box, bag, or the like, whether a recurring schedule should be set for shipping and delivery of items, what navigational path should be taken, the priority for navigation or operational functions, and the like.

In some embodiments, the robotic device may comprise a basket or container in which items are transported. FIG. 1 illustrates an example of a design of a robotic device. In FIG. 1, robotic device 100 is shown comprising container 101 utilized for storing items (not shown), along with suspension system 103 utilized for overcoming various terrain, and wheels 102 such as mecanum wheels. In some embodiments, a container of a robotic device may comprise a closed container. In some embodiments, a robotic device may comprise a locking mechanism for locking items within a container. In some embodiments, a robotic device may comprise a module for locking and unlocking a container in which items are contained. For example, an individual may require to be authenticated, speak a voice command, utilize a biometric scanner such as a facial or hand scanner, an identification card scanner, utilize a voice module, utilize an unlocking mechanism such as with a key, utilize a code scanning element such as a QR or barcode scanner, send a command via a remote control or application of a communications device, by pressing a sequence of buttons, by utilizing a pin code or the like. In some embodiments, the robotic device may include various modules for keeping items at various temperatures. For example, a robotic device may utilize a freezing module and/or a refrigeration module for the purpose of keeping items at particular temperatures. In embodiments, a robotic device may include a warming module including cooking modules such as microwaving or oven modules may be utilized for cooking items to be delivered to an individual. The robotic device may obtain the item which will be placed in the warming module, whereby the item is heated, and the robotic device will transport the item to the individual once the individual arrives at a predetermined location. In some embodiments, a robotic device may navigate to a delivery location and wait at that location until the individual who is the item recipient arrives. In embodiments, if the item recipient does not retrieve the items after a predetermined amount of time, the robotic device may send back the package to the sender, place the item in a holding area such as a mail waiting storage area, or the like. In embodiments, after a recipient retrieves the item from the robotic device, the robotic device may navigate to a next location, such as to a new item recipient location, a storage location of the robotic device, or the like.

Figure 2:
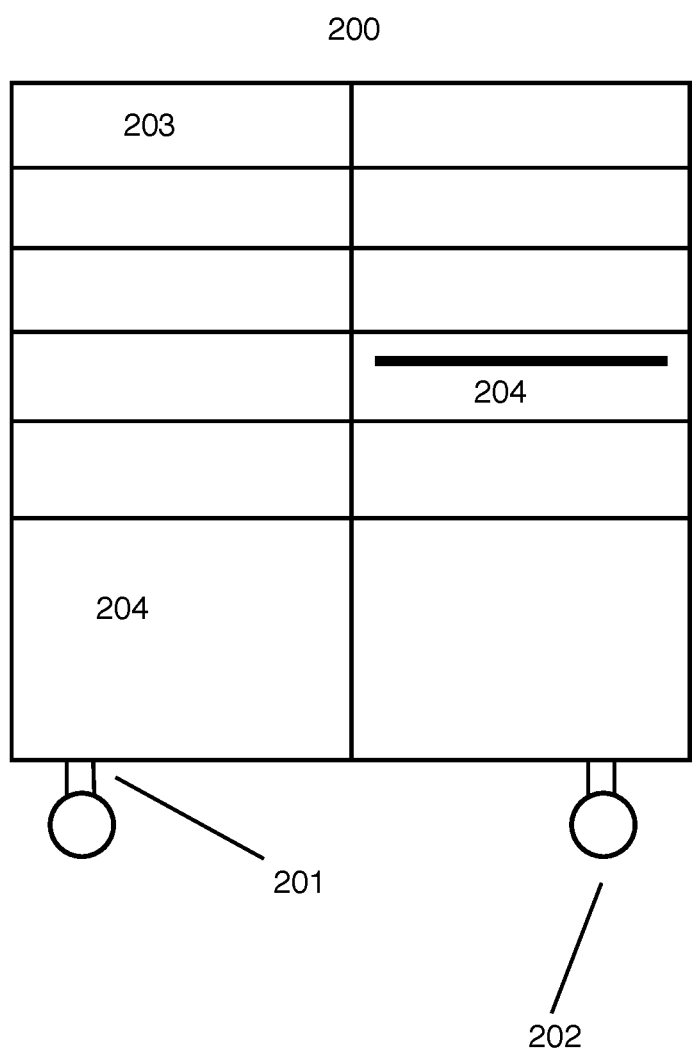
FIG. 2 is a schematic diagram of an example of a robotic device with which the present techniques may be implemented in some embodiments.

In some embodiments, a robotic device may comprise multiple containers. In embodiments, for example, a robotic device may appear as a mobile mailbox for multiple units. In some embodiments a single robotic device may be utilized for delivery of items to multiple different delivery locations such that a compartment of a robotic device may contain items for a first individual while a second compartment may be utilized for a second individual. In embodiments, compartments may be locked until the individual authorized for pickup of the items has arrived, has been verified, or has unlocked the compartment. In FIG. 2 an example of a robotic device is illustrated. FIG. 2 displays robotic device 200 shown with suspension system 201 for overcoming various terrain and set of wheels 202 such as mecanum wheels. Robotic device 200 further comprises mailboxes 203 for small parcels and packages (not shown), a slot for outgoing items 204, and large compartments 204 utilized for larger items such as large packages or parcels (not shown). In FIG. 2, the compartments such as large compartments 204 or small compartments 203 may utilize locking mechanisms of which an individual must unlock to retrieve the items within. For example, an individual may require to be authenticated, speak a voice command, utilize a biometric scanner such as a hand scanner, utilize a voice module, utilize an unlocking mechanism such as with a key, utilize a code scanning element such as a QR or barcode scanner, send a command via a remote control or application of a communications device, by pressing a sequence of buttons, by utilizing a pin code or the like.

In embodiments, a module for delivering items to a recipient may be utilized such as a lockable box mechanism. In embodiments for example, the robotic device may comprise multiple lockable boxes, of which the robotic device may drop off at a delivery location. In embodiments for example, the robotic device may have items placed for delivery in the lockable boxes of the robotic device, and the robotic device may navigate to each respective recipient location. When the robotic device arrives at these locations, the robotic device may drop off the lockable box at this location of which the recipient is to unlock and retrieve their items from the box. Once the recipient retrieves their items, the recipient may carry the box back to the robotic device to place the box back into a slot of the robotic device, may call forth the robotic device to pick up the box from the location of the recipient or from a predetermined location, or the like. In embodiments, a recipient may require to be authenticated for unlocking the box such as by speaking a voice command, utilizing a biometric scanner such as a facial or hand scanner, an identification card scanner, utilize a voice module, utilize an unlocking mechanism such as with a key, utilize a code scanning element such as a QR or barcode scanner, send a command via a remote control or application of a communications device, by pressing a sequence of buttons, by utilizing a pin code or the like. In embodiments, the recipient may place outgoing items into the lockable box and when the robotic device obtains the box the items will be sent away.

Figure 3:
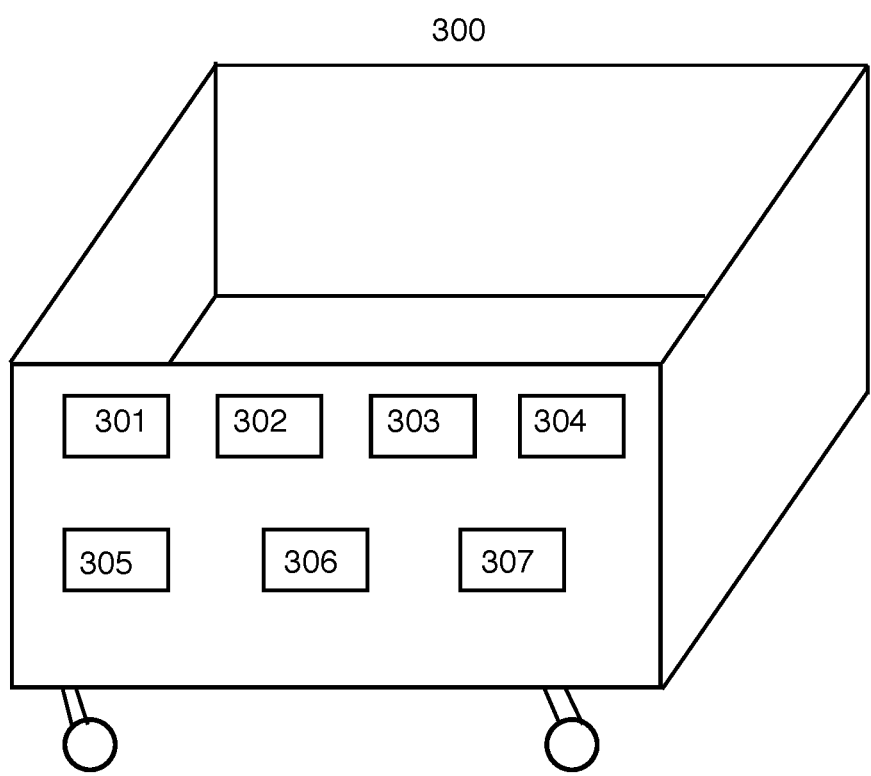
FIG. 3 is a schematic diagram of an example of a robotic device with which the present techniques may be implemented in some embodiments.

FIG. 3 depicts an example of a robotic device 300 with processor 301, memory 302, a first set of sensors 303, second set of sensors 304, network communication 305, movement driver 306, and storage module 307. The first and second set of sensors 303 and 304 may include depth measuring devices, movement measuring devices, and the like. In some embodiments, the robotic device may include the features of a robotic device described herein. The robotic device may have a variety of shapes, like circular, square, trapezoidal, etc. and may comprise a container, basket, platform, or the like. In some embodiments, program code stored in the memory 302 and executed by processor 301 may effectuate the operations described herein. Some embodiments additionally include user device (not shown) having a touchscreen (not shown) with a software application coupled to the robotic device 300. In some cases, the robotic device charges at a base station (not shown), which in some cases, may include processors and memory by which some of the present functionality is implemented and which may wirelessly communicate with the robotic device 300 in some cases where computations are offloaded in real time.

In some embodiments, robotic devices may be configured solely for the purpose in which the type of item is to be handled. For example, a robotic device may comprise a module for only heavy items and that robotic device will only handle the storing and transport of heavy items. As another example, a robotic device may comprise a temperature control module for only handling refrigerated items and that robotic device will only handle the storing and transport of items requiring refrigeration. As a further example, a robotic device may comprise a module for storing and transporting items of an envelope type and the robotic device will only store and transport such items. In some embodiments, a robotic device may be of a large or small size. In some embodiments, a robotic device may comprise of the handling of bulk items. In some embodiments, a robotic device may comprise of a container for containing and transporting large volumes of items. In some embodiments, a robotic device may comprise a container for containing and transporting a small volume of items.

In embodiments, a robotic device may contain a module utilized for the purpose of determining the physical internal contents space usage of items obtained by the robotic device. For example, the robotic device may utilize a module with the purpose of determining how much space is left within the robotic device in which items may be placed. As an example, if the contents of a robotic device are taking up a predetermined amount of space of the robotic device, one or more processors of the robotic device may determine that the robotic device has reached an internal contents limit capacity. In such a situation, the robotic device may alert an individual, a control system, or another robotic device to this information. A robotic device may alert an individual via a message or other means of a screen with graphical user interface of the robotic device, by making a sound, by sending a message to an application of a communications device of an individual, etc. In embodiments, a robotic device may utilize a module for sending and receiving signals, indicating to a central control system or to another robotic device, that the robotic device has reached capacity and that another robotic device is needed to provide further services. In embodiments, if a robotic device has reached an internal contents limit capacity, an individual may need to summon a second robotic device for adding additional items to. For example, if an individual is sending a large number of outbound packages of which a first robotic device cannot handle all of, the individual may need to summon a second robotic device. In embodiments, if a robotic device has reached an internal contents limit capacity, a second robotic device may be summoned by the first robotic device or a control system utilized for controlling or coordinating several robotic devices to continue assisting the individual.

In some embodiments, one or more processors of a robotic device may process data in regards to the types of items to be transported by the robotic device, and the data indicative of the item for purchase may determine how the item is stored by the robotic device. For example, the items may be distributed based on weight, shape, size, or type of item. For example, heavy items may be placed in locations so as to evenly distribute the weight of the heavy items, such as heavier items being placed at each corner of a container of a robotic device. As another example, fragile items with a tendency of being damaged if mishandled or misplaced, may be placed on top of other items, or in a special compartment so as to avoid becoming damaged during transport. In some embodiments, a robotic device may utilize a module which will monitor the stability of the robotic device and if the module determines that the robotic device is becoming unstable, it may make an alert that items must be repositioned in order to fix the instability issue. In some embodiments, a robotic device may include a module for the placement, positioning, or repositioning of items to be placed in the container of the robotic device. In some embodiments, an individual may need to physically place, position, or reposition items within the container of the robotic device. In some embodiments, if an item has accidentally moved within the container of the robotic device thereby posing a risk to the item or stability of the robotic device, a module of the robotic device or individual may need to reposition the item.

In some embodiments, one or more processors may process data indicative of the type and characteristics of an item to be stored and transported by a robotic device and the one or more processors may thereby determine how the item is to be stored and transported. As an example, if the items to be stored and transported are of a fragile nature or include items of a fragile nature, these items may be stored in a separate compartment of the robotic device, or the robotic device may avoid navigating at a particular speed, avoid work surface transitions which could provide an unstable environment, or the like. For example, if a robotic device is storing and transporting items of a fragile nature, the robotic device may avoid navigating over, for example, speed bumps on a road, uneven pavement, or the like as such elevation change may cause the fragile items to become unstable and break. In some embodiments, one or more processors of a robotic device may alter the speed at which the robotic device travels based on sensory input indicating the type of work surface being operated on. For example, the one or more processors may control a robotic device to navigate at a higher rate of speed on concrete as the work surface may be smooth, while controlling the robotic device to navigate at a slower rate of speed on uneven work surfaces such as for example in a asphalt.

In some embodiments, a robotic device may comprise a payment module for the purchase of packaging materials or outbound postage with the purpose of completing transactions for an individual. For example, a robotic device may have a physical module present on the robotic device of which payments can be made. Examples include a module for receiving and dispensing cash, a module for receiving card payments such as credit, debit, or gift cards, a card chip-reader, a module for receiving e-payments such as, for example apple pay or the like. In some embodiments, the robotic device may have a module for receiving payments electronically in which payments may be made electronically by an individual prior to the individual arriving to send an outgoing item. For example, an individual may utilize an application of a communications device such as a smart phone, laptop, tablet or the like, making a payment through the application of which the robotic device receives this payment data and processes the transaction. The individual may thereafter arrive to receive the postage stamp, prepaid package or envelope or the like. In some embodiments, one or more processors may process payments made by an individual. In some embodiments a control system may process payments made by an individual. In some embodiments, a robotic device may store payment information of an individual and communicate with another device to process payments. For example, a robotic device may obtain payment information such as card information, electronic payment information such as apple pay or the like, receive cash, and communicate with another device for processing the payment such as a central system for multiple robotic devices which processes payments.

In embodiments, once a robotic device has completed all work functions for an individual, the robotic device may navigate to a predetermined location. In some embodiments, a robotic device may navigate to provide services to a second individual once tasks have been completed for a first individual. In some embodiments, a robotic device may navigate to a robotic device storage area once tasks have been completed for a first individual. In some embodiments, a robotic device may navigate to a battery charging area once tasks have been completed for a first individual. In some embodiments, a robotic device may navigate to a mailing area once tasks have been completed for a first individual.

In embodiments, the robotic device may compile and catalogue all the data from each work session. In embodiments the various data compiled and catalogued may include but is not limited to data pertaining to: mapping, navigation, obstacles encountered or not encountered, floor type, items, packaging materials, postage materials, user preferences, path planning, SLAM data, features of the work environment, payment data, transaction history, and the like. In embodiments, data pertaining to a package or postage purchases made by an individual may be compiled by one or more processors of a robotic device for future use. For example, data pertaining to the time, date, and location of the purchase, the packaging or postage materials purchased, how the individual paid, where the items were delivered to such as address, and the like data may be compiled and catalogued. Further, demographic information on the part of the individual may be compiled for future use such as, for example, age, gender, ethnicity, or the like data may be compiled and catalogued. In embodiments, payment data pertaining to a purchase, such as how an individual paid for packaging or postage, such as, for example, credit card information, or e-pay data such as apple pay data, may be saved for future use such that the individual does not need to re-input this information for future purchases. In embodiments, data pertaining to the location items were delivered to may be compiled and catalogued for future use, such as if the items were delivered to a particular address, or if items are sent outbound to a particular address on a recurring basis, or if the individual picked up inbound items from a central location such as in a mailroom, or if an individual had items delivered to them at their front door or the like. In embodiments, one or more processors of the robotic device may access the catalogued and compiled data for the purpose of attempting to predict efficient methods for a variety of situations in the future. For example as the one or more processors of the robotic device compile and catalogue path planning, SLAM, mapping, obstacle, work surface type, and the like data, the one or more processors of the robotic device may generate a new path plan when a new work order is initiated, such that all the prior data obtained is utilized with the purpose of creating the most efficient path plan possible based on the specifics of the work order. For example, if many houses on a block of a neighborhood are to receive packages, a robotic device may deliver packages to each home that is next to the prior home items were delivered to in a consecutive order, the robotic device taking the shortest route possible and avoiding obstacles, potential elevation change issues on a work surface such as speed-bumps and the like in order to protect the fragile items. In embodiments, the one or more processors may access prior purchasing data on the part of the individual such that the robotic device may predict or recommend packaging or postage for purchase to the individual based on compiled and catalogued data on the part of the individual from prior purchases. For example, if an individual routinely selects the same envelope and postage as a part of items to be purchased, the robotic device may recommend this envelope and postage to the individual when the individual is detected by the robotic device. In some embodiments, the one or more processors of a robotic device may predict postage or packaging for purchase based on prior purchase history on the part of the individual. For example, if an individual makes the same purchase at the same time on the same day of the week, one or more processors of the robotic device may predict that the individual will do so again on a following week and prepare such items for purchase and alert the individual that the packaging and postage items have already been prepared for mailing by the robotic device and simply await payment. In some embodiments, a screen with graphical user interface of a robotic device may display advertising materials. In some embodiments advertising materials displayed by a screen with graphical user interface of a robotic device may be targeted to a particular individual based on data collected regarding the individual. In some embodiments, data may be compiled and catalogued by the one or more processors of the robotic device regarding all purchasers including demographic information such as age, gender, ethnicity or the like, data pertaining to each individual's payment method, purchasing history, and the like may be obtained and compiled. In embodiments, the one or more processors of a robotic device may utilize demographic data on the part of an individual, accessing the compiled data of other individuals in a similar demographic to the individual, in order to recommend an item for purchase to the individual based on the popularity of that item being purchased by the other individuals in a similar demographic of the individual. For example, a robotic device servicing, for example, an elderly, religious, or other type of community, may provide holiday cards for purchase to individuals in such a community during a particular holiday period or the like. As a further example, the one or more processors of a robotic device may utilize all the compiled and catalogued data of all or many individuals in recommending packaging or postage items for purchase to individuals based on the popularity of items being purchased by other individuals. For example, if a particular method of outbound mail is popular such as a particular packaging material or postage is overwhelmingly popular, a robotic device may recommend such materials for purchase to an individual. In some embodiments data pertaining to purchasing history may be shared with central control system. For example, data may be shared indicative of sales trends such as which postage or packaging products are trending positively and or negatively, how various demographics make purchases, and the like. In some embodiments, data pertaining to an individual's repeated purchases may be catalogued or compiled to create, for example, a loyalty index. In some embodiments, if an individual has previously had an item delivered to a particular location such as at their front door, and the same individual has a package waiting for delivery and the individual is en route to their home, the one or more processors of a robotic device containing the package may navigate to the front door for delivery of the item prior to the individual arriving at a predetermined location, after the individual arrives at a predetermined location, at the same time the individual arrives at a predetermined location, or upon the individual arriving within a predetermined vicinity of the robotic device. In embodiments, if a robotic device has navigated to a location for delivery of items, this information may be shared with an application of a communications device of the individual to alert the individual to the location of the robotic device. In embodiments, if an individual elects to receive delivery of items in a location other than that of where the robotic device has navigated to, the robotic device may navigate to the location of the individual to deliver the items. In some embodiments, a robotic device may alert an individual wishing to send an outgoing item that mailing services may be slow, such as, for example, due to a high volume of packages being sent during a holiday period. In some embodiments, data may compiled and catalogued by one or more processors of a robotic device from prior work sessions may indicate that an individual may need a second robotic device and the one or more processors of the robotic device may predict that a second robotic device may be necessary, and as such, a second robotic device may be summoned to assist an individual without the individual having to request a second device. For example, if a robotic device is utilized for the mailing of packages from a warehouse facility, during a high sales season, data may indicate that multiple robotic devices are often required, and as such multiple robotic devices may arrive for transport of outbound packages. In some embodiments, the one or more processors of the robotic device may catalogue and compile data indicative of functionality on the part of the robotic device. For example, data indicative of robotic device storage location, battery life, errors, and the like may be compiled. As an example, data indicative of the number of trips, or length of navigation allowed prior to a battery of a robotic device requiring charging may be compiled and catalogued by one or more processors of a robotic device to predict when a robotic device's battery should be charged. In embodiments, multiple robotic devices may communicate with each other or a central system of multiple robotic devices such that the data obtained from each robotic device is shared with all the robotic devices. In some embodiments, if an individual has routinely utilized a robotic device in a reckless or dangerous manner, such as by controlling remotely, the navigation of the robotic device such that the robotic device often impacts with obstacles, individuals, other robotic devices, walls, the work environment, or the like, the individual may be banned from utilizing the robotic devices.

In some embodiments, multiple robotic devices may collaborate with each other in order to achieve a designated goal. In embodiments, for example, if a second robotic device is needed, a first robotic device may communicate with a second robotic device to provide an individual with a second robotic device. As an example, if a first robotic device has reached a carrying capacity, the first robotic device may communicate with a second, third, or the like robotic device if an individual requires further services. As another example, if a first robotic device has been providing services to an individual, and the first robotic device has encountered an error, such as requiring a reboot of the system of the first robotic device, the first robotic device may communicate with a second robotic device to provide services to the individual. In embodiments, if a robotic device identifies that it is the last available robotic device or that there are few robotic devices left in a robotic device retrieval location for individuals, such as, for example, a robotic device retrieval location, the robotic device may communicate with other robotic devices to alert other robotic devices that additional robotic devices are needed at the retrieval location. In embodiments, robotic devices may communicate with each other in regards to status updates in the work environment, such as for example, reporting a pothole, a spill, encountering an unexpected obstacle, reporting that all robotic devices are being utilized, and the like.

Figure 4A:
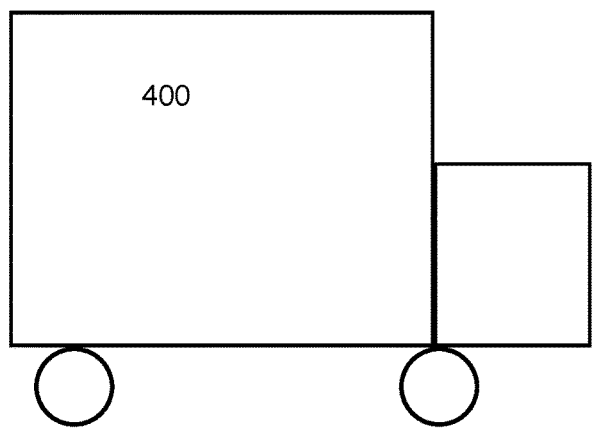
FIG. 4A-D depict a series of steps describing an example of a robotic device's interaction with a delivery and collection vehicle.
Figure 4B:
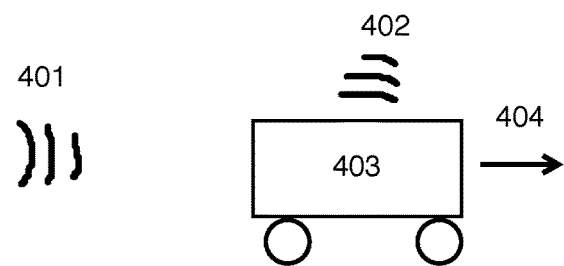
Figure 4C:
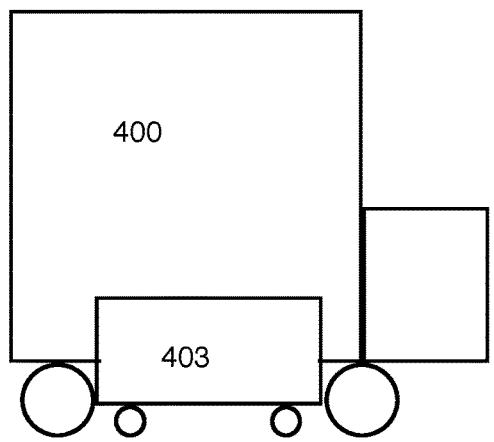
Figure 4D:
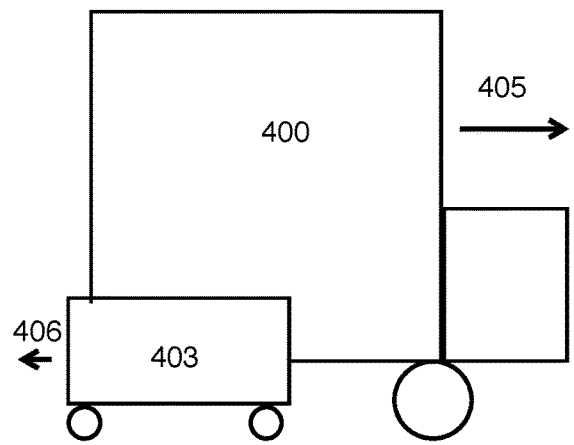

In some embodiments, an entity responsible for managing packages, parcels, mail or the like, may transmit a signal to a receiver of the robotic device to notify the one or more processors of the robotic device of the day and time of inbound and outbound items to be delivered and collected by the robotic device to a delivery and collection vehicle of the entity. In some embodiments, a signal received by the receiver of a robotic device may indicate immediate transport of the robotic device to the inbound and outbound item delivery and collection location. The signal may be a Wi-Fi signal, Bluetooth signal, RF signal, or other type of wireless signal. In some embodiments, a delivery and collection vehicle, such as a mail truck, may broadcast a signal to item storing robotic devices within the same region as the delivery and collection vehicle, notifying the robotic devices that it is time for item delivery and collection at which point each robotic device within the area may navigate to their respective delivery and collection locations. Once all items have been collected and delivered by the delivery and collection vehicle, the delivery and collection vehicle may broadcast another signal to notify the robotic devices that they may navigate back to their respective storage or the like locations. Alternatively, in some embodiments, a barcode or other type of identification tag located on the robotic device may be scanned by a scanner of the delivery and collection vehicle after item delivery and collection to alert the robotic device that it may navigate back to its storage or the like location. In other embodiments, other methods of alerting the robotic device that item delivery and collection is complete and that the robotic device may navigate back to its storage or the like location may be used, such as, voice activation, activating a button on a screen with graphical user interface of the robotic device, or the like. In some embodiments, the entity responsible for managing the collection and delivery of items may monitor the location of the delivery and collection vehicle in real-time. When the item delivery and collection vehicle reaches within a predetermined range of the robotic device, the entity may send a signal via Wi-Fi, Bluetooth, RF, or the like, to the robotic device, notifying the robotic device that it is time for item delivery and collection, at which point the robotic device may navigate to the item delivery and collection location. When the item delivery and collection vehicle reaches outside a predetermined range of the robotic device, the entity may send a signal via Wi-Fi, Bluetooth, RF, or the like, to the robotic device notifying the robotic device that item delivery and collection is complete, at which point the robotic device may navigate back to its storage or the like location. In some embodiments, the item delivery and collection vehicle, and/or the entity responsible for managing the collection and delivery of items may send an item delivery and collection schedule to the robotic device via Wi-Fi, Bluetooth, RF, or the like. In some embodiments, the robotic device may transmit a signal to the item delivery and collection vehicle and/or the entity responsible for managing the collection and delivery of items via Wi-Fi, Bluetooth, RF, or the like. The signal may be sent when the robotic device is ready for the item delivery and collection vehicle to collect and deliver the items if item delivery and collection is not required at a particular time, to notify the entity or delivery and collection vehicle of the day and time item delivery and collection is required, etc. In some embodiments, the entity responsible for managing the delivery and collection of items may be an autonomous control system of specialized computing device or may be an operator. FIGS. 4A-D illustrate an example of steps that may be taken by an entity responsible for the delivery and collection of items of robotic devices. In FIG. 4A delivery and collection vehicle 400 broadcasts signal 401 that it is within a predetermined distance of robotic device (not shown). In FIG. 4B Robotic device 403 has received signal 402 from delivery and collection vehicle and is navigating 404 to delivery and collection vehicle. In FIG. 4C robotic device 403 has arrived to delivery and collection vehicle 400 for loading and unloading of items (not shown). In FIG. 4D unloading and loading of items (not shown) has been completed and delivery and collection vehicle 400 is navigating away 405 from robotic device 403 and robotic device 403 is navigating away 406 from delivery and collection vehicle 400. In this example, the robotic device navigates to the item delivery and collection vehicle, however in alternative embodiments, the item delivery and collection vehicle may grab the robotic device utilizing an armature of the delivery and collection vehicle. Other embodiments are also possible. The figures represented in these steps are not intended to be limiting or exclusive in nature.

Figure 5:
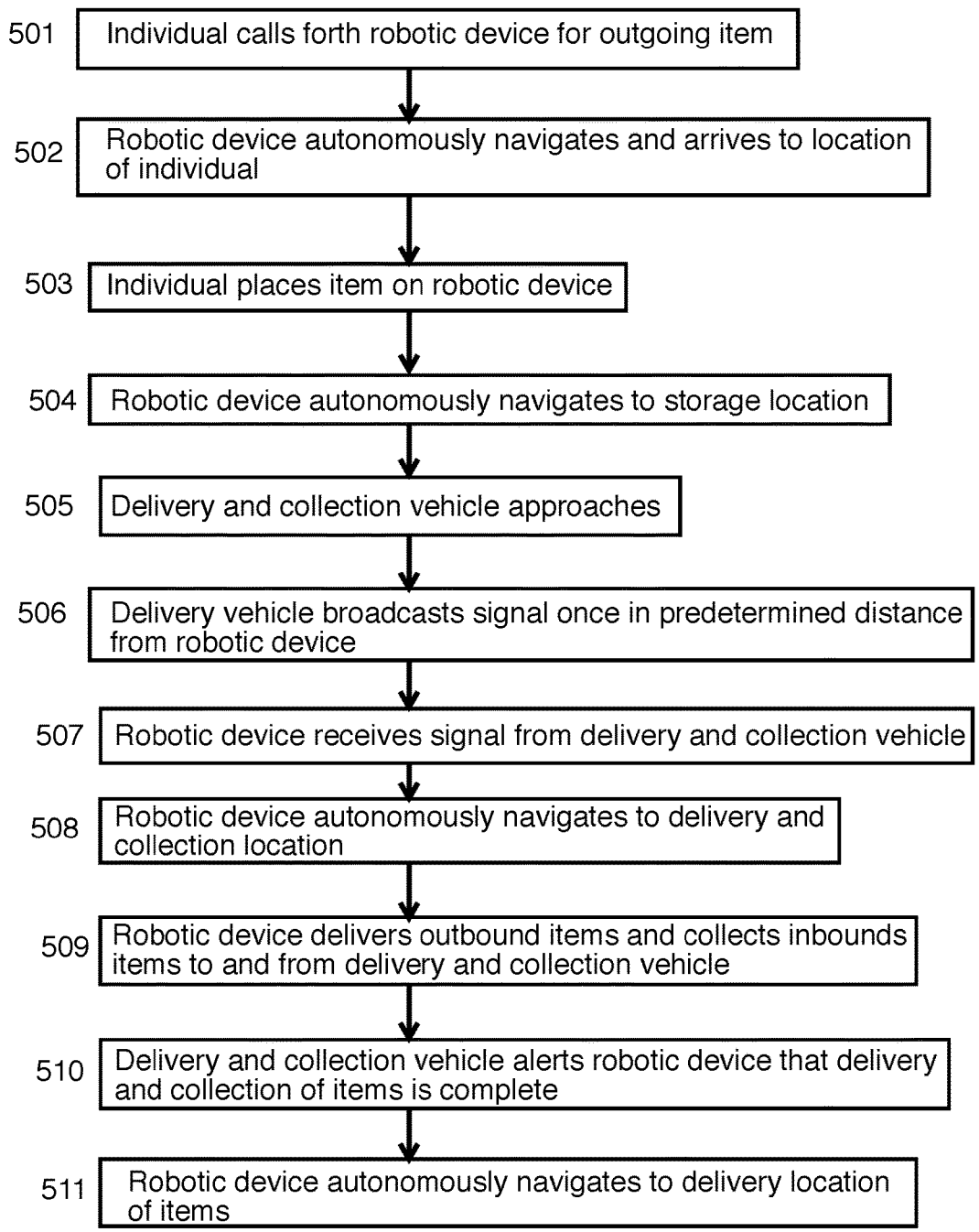
FIG. 5 is a flowchart describing an example of a series of steps which may be undertaken by a robotic device with regards to inbound and outbound items.

FIG. 5 illustrates a flowchart describing embodiments of a method of a robotic device 501, 502, 503, 504, 505, 506, 507, 508, 509, 510 and 511 corresponding with steps performed in some embodiments.

In some embodiments, the robotic device may be utilized in other capacities. In embodiments for example, the robotic device may be utilized for transporting luggage in airports, a passenger arriving for example, placing their luggage into the robotic device, and the robotic device transporting the luggage for the individual. For example, for carryon items, the passenger may place their carryon luggage items on the robotic device and the robotic device may follow the passenger through the airport including security screening, to the gate, and the like. Additionally, the robotic device may be utilized for stow away items such as, for example, luggage that is to be placed in the bottom of the airplane, the passenger placing the luggage items on the robotic device and the robotic device transporting the items through security and the like and delivering the luggage to the airplane. In other embodiments as an example, the robotic device may be utilized in a shopping context such as in a grocery store, mall, retail establishment or the like. The robotic device may follow a purchaser around the store and obtain items for purchase selected by the purchaser, conduct a payment checkout, and deliver the items to the purchaser's vehicle. The purchaser in other embodiments could make item selections in advance via an application of a communications device, the robotic device obtaining the items, conducting a payment transaction, and delivering the items to the purchaser.

In some embodiments, the one or more processors of a robotic device may enact a diagnostic check to check the functionality of the various components of the robotic device.

In some embodiments a centralized system of multiple robotic devices may obtain data from the multiple robotic devices and communicate with each robotic device with regards to updates in the work environment, data compiled from other robotic devices, and the like.

In some embodiments, all data are processed on the robotic device. In other embodiments, some data are processed on at least one separate device, such as a docking station of the robotic device or through another device.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or."

The present techniques will be better understood with reference to the following enumerated embodiments:

1. A robotic device for carrying, transporting and delivering packages, parcels, and mail items comprising: one or more processors, a chassis including a set of wheels, a motor for driving the set of wheels, a suspension system, a rechargeable battery for providing power to the robotic device, a control system module for controlling the movement of the robotic device, a set of sensors, a screen with graphical user interface; a module for receiving packages, parcels, and mail items; and a module for delivering packages, parcels, and mail items.
2. The robotic device of embodiment 1, wherein: the robotic device autonomously navigates through the work environment to deliver and collect packages, parcels and mail items.
3. The robotic device of embodiment 1, wherein: the robotic device delivers and collects packages, parcels and mail items from multiple locations in a single work session.
4. The robotic device of embodiment 3, wherein: the robotic device navigates in a most efficient manner to deliver and collect packages, parcels and mail items.
5. The robotic device of embodiment 4, wherein: the robotic device navigates to locations in a consecutive order, the robotic device navigating to each location consecutively in such a manner that each successive location visited is the location closest to the location visited immediately previously.

6. The robotic device of embodiment 1, wherein: a first robotic device summons a second robotic device when a first robotic device has reached a predetermined capacity.

7. The robotic device of embodiment 1, wherein: a robotic device contains multiple compartments, each compartment containing packages, parcels, and mail items to a specific individual.

8. The robotic device of embodiment 7, wherein an individual must unlock a compartment specific to them utilizing any of: speaking a voice command, utilizing a biometric scanner, utilizing a voice module, utilizing a key, utilizing a code scanning element such as a QR or barcode scanner, utilizing an identification card scanner, sending a command via a remote control or application of a communications device, by pressing a sequence of buttons, by utilizing a pin code.

9. The robotic device of embodiment 1, wherein the delivering module is a box delivery mechanism, a sliding mechanism, a pushing mechanism, an armature, a tilting or angling mechanism.

10. The robotic device of embodiment 1, wherein the robotic device is summoned for a work session by an individual using an application of a communications device, voice command, remote control, or via a screen with graphical user interface of a robotic device.

11. The robotic device of embodiments 1 wherein the robotic device is summoned for a work session by a delivery and collection vehicle, once the delivery or collection vehicle arrives within a predetermined distance of the robotic device.

12. The robotic device of embodiment 11, wherein the robotic device delivers outgoing packages, parcels and mail items to the delivery and collection vehicle and receives inbound packages, parcels, and mail items from the delivery and collection vehicle.

13. The robotic device of embodiment 1, wherein the robotic device comprises a module for printing postage labels.

14. The robotic device of embodiment 1, wherein the robotic device comprises a module for providing packaging materials to an individual.

15. The robotic device of embodiment 1, wherein the robotic device comprises a temperature control module such as a cooling module, a refrigeration module, a freezing module, a warming module, a heating module, a cooking module.

16. The robotic device of embodiment 1, wherein the robotic device comprises a module for processing payment transactions.

17. The robotic device of embodiment 1, wherein the robotic device comprises a QR code or barcode code scanning module.

18. The robotic device of embodiment 1, wherein the robotic device transmits a communication to an individual alerting the individual that the robotic device contains a package, parcel, or mail item of the individual when the robotic device has obtained a package, parcel, or mail item addressed to the individual.

19. A method, comprising the operations of any one of embodiments 1-18.

I claim:

1. A robotic device for carrying, transporting, and delivering packages, parcels, and mail items, the robotic device comprising:
   one or more processors;
   a chassis including a set of wheels;
   a motor for driving the set of wheels;
   a suspension system;
   a rechargeable battery for providing power to the robotic device;
   a control system module for controlling the movement of the robotic device;
   a set of sensors;
   a screen with graphical user interface;
   a module for receiving packages, parcels, and mail items; and
   a module for delivering packages, parcels, and mail items, wherein:
      the robotic device delivers and collects packages, parcels and mail items from multiple locations in a single work session;
      the robotic device navigates in a most efficient manner to deliver and collect packages, parcels and mail items; and
      the robotic device navigates to locations in a consecutive order, the robotic device navigating to each location consecutively in such a manner that each successive location visited is the location closest to the location visited immediately previously.

2. The robotic device of claim 1, wherein the robotic device autonomously navigates through the work environment to deliver and collect packages, parcels and mail items.

3. The robotic device of claim 1, wherein the robotic device summons a second robotic device when the robotic device has reached a predetermined capacity.

4. The robotic device of claim 1, wherein the robotic device includes multiple compartments, each compartment containing packages, parcels, and mail items to a specific individual.

5. The robotic device of claim 4, wherein an individual must unlock a compartment specific to them utilizing any of: speaking a voice command, utilizing a biometric scanner, utilizing a voice module, utilizing a key, utilizing a code scanning element such as a QR or barcode scanner, utilizing an identification card scanner, sending a command via a remote control or application of a communications device, by pressing a sequence of buttons, by utilizing a pin code.

6. The robotic device of claim 1, wherein the delivering module is a module for delivering a box, a sliding mechanism, a pushing mechanism, an armature, a tilting mechanism, an angling mechanism.

7. The robotic device of claim 1, wherein the robotic device is summoned for a work session by an individual using an application of a communications device, voice command, remote control, or via a screen with graphical user interface of a robotic device.

8. The robotic device of claim 1, wherein the robotic device is summoned for a work session by a delivery and collection vehicle, once the delivery and collection vehicle arrives within a predetermined distance of the robotic device.

9. The robotic device of claim 8, wherein the robotic device delivers outgoing packages, parcels and mail items to the delivery and collection vehicle and receives inbound packages, parcels, and mail items from the delivery and collection vehicle.

10. The robotic device of claim 1, wherein the robotic device comprises a module for printing postage labels.

11. The robotic device of claim 1, wherein the robotic device comprises a module for providing packaging materials to an individual.

12. The robotic device of claim 1, wherein the robotic device comprises a temperature control module for at least one of: a cooling, refrigeration, freezing, warming, a heating, and cooking.

13. The robotic device of claim 1, wherein the robotic device comprises a module for processing payment transactions.

14. The robotic device of claim 1, wherein the robotic device comprises a QR code or barcode code scanning module.

15. The robotic device of claim 1 wherein the robotic device transmits a communication to an individual alerting the individual that the robotic device contains a package, parcel, or mail item of the individual when the robotic device has obtained a package, parcel, or mail item addressed to the individual.

16. A method for collecting and delivering packages, parcels and mail items, the method comprising:
    providing a robotic device, the robotic device comprising:
        one or more processors;
        a chassis including a set of wheels;
        a motor for driving the set of wheels;
        a suspension system;
        a rechargeable battery for providing power to the robotic device;
        a control system module for controlling the movement of the robotic device;
        a set of sensors;
        a screen with graphical user interface;
        a module for receiving packages, parcels, and mail items;
        a module for delivering packages, parcels, and mail items;
        a module for providing packaging materials;
        a module for printing labels; and
        a module for processing payments;
    the robotic device receiving a command for a work order from an individual or delivery and collection vehicle;
    the robotic device receiving packages, parcels, and mail items from an individual or delivery and collection vehicle; and
    the robotic device delivering packages, parcels, and mail items to a predetermined location, wherein:
        the robotic device delivers and collects packages, parcels and mail items from multiple locations in a single work session;
        the robotic device navigates in a most efficient manner to deliver and collect packages, parcels and mail items; and
        the robotic device navigates to locations in a consecutive order, the robotic device navigating to each location consecutively in such a manner that each successive location visited is the location closest to the location visited immediately previously.

17. The method of claim 16, wherein the robotic device navigates to a predetermined location upon receiving a signal broadcast by a delivery and collection vehicle once the delivery and collection vehicle arrives within a predetermined distance of the robotic device.

18. The robotic device of claim 1, further comprising:
    a module for providing packaging materials;
    a module for printing labels; and
    a module for processing payments, wherein:
        the robotic device receives a command for a work order from an individual or delivery and collection vehicle;
        the robotic device receives packages, parcels, and mail items from an individual or delivery and collection vehicle; and
        the robotic device delivers packages, parcels, and mail items to a predetermined location.

19. The method of claim 16, wherein the robotic device is summoned for a work session by an individual using an application of a communications device, voice command, remote control, or via a screen with graphical user interface of a robotic device.

20. The method of claim 16, wherein at least one of:
    the robotic device summons a second robotic device when the robotic device has reached a predetermined capacity;
    the robotic device includes multiple compartments, each compartment containing packages, parcels, and mail items to a specific individual;
    the robotic device transmits a communication to an individual alerting the individual that the robotic device contains a package, parcel, or mail item of the individual when the robotic device has obtained a package, parcel, or mail item addressed to the individual; and
    the robotic device delivers outgoing packages, parcels and mail items to a delivery and collection vehicle and receives inbound packages, parcels, and mail items from the delivery and collection vehicle.

* * * * *